United States Patent [19]
Farnham

[11] Patent Number: 5,826,618
[45] Date of Patent: Oct. 27, 1998

[54] BONDED ELASTOMER SEAL VALVE ASSEMBLY

[75] Inventor: Gilbert Roland Farnham, Sycamore, Ill.

[73] Assignee: Cooper Industries, Inc.

[21] Appl. No.: 857,405

[22] Filed: May 16, 1997

[51] Int. Cl.[6] .................................................. F16K 15/00
[52] U.S. Cl. ...................... 137/614.2; 251/324; 251/357; 431/344
[58] Field of Search ........................ 137/614.2; 251/324, 251/356, 357, 900; 431/344

[56] References Cited

U.S. PATENT DOCUMENTS

| | | |
|---|---|---|
| 2,524,129 | 10/1950 | Klein .................................. 251/357 X |
| 3,436,164 | 4/1969 | Deucher . |
| 3,802,828 | 4/1974 | Mercer et al. . |
| 3,831,900 | 8/1974 | Matousek et al. .................. 251/357 X |
| 4,597,732 | 7/1986 | Yoshinaga . |
| 4,643,671 | 2/1987 | Yoshinaga . |
| 4,804,324 | 2/1989 | Yoshinaga . |
| 4,881,894 | 11/1989 | Chapin et al. . |
| 5,123,837 | 6/1992 | Farnham et al. . |
| 5,176,175 | 1/1993 | Farnham et al. . |

OTHER PUBLICATIONS

Bowman, Don & Golden, Richard. "A sealing solution for the CFC ban". *Design News*, (Sealing Materials) 77–78, 1996.
Ad. "Make Pressurized Fasteners Positively Leakproof!", *Wynn's–Precision, Inc.* (Dyna–Seal, Bolt & Fastener Seals) 4 pages. 1989.

*Primary Examiner*—Kevin Lee
*Attorney, Agent, or Firm*—Burns, Doane, Swecker & Mathis, L.L.P.

[57] ABSTRACT

A valve for regulating a flow of pressurized gas in a torch includes a valve body having a central bore and a connected outlet bore for passage of gas from a source to a torch tube. A valve needle is disposed in the central bore and is movable to open and close the central bore from the outlet bore. A valve seat is formed in a portion of the central bore and an end face of the valve needle faces the valve seat. A bonded elastomer seal is loosely disposed between the end face and the valve seat. When the valve needle is in the closed position, the end face compresses the bonded elastomer seal on the valve seat which closes the central bore from the outlet bore.

12 Claims, 3 Drawing Sheets

BONDED ELASTOMER SEAL VALVE ASSEMBLY

FIELD OF THE INVENTION

The invention is directed to a valve assembly for controlling a flow of a pressurized gas or fluid in an apparatus using the gas or fluid. More particularly, the invention relates to a valve assembly for a torch.

BACKGROUND OF THE INVENTION

Valves for controlling the flow of fuel in torches are described, for example, in U.S. Pat. Nos. 5,123,837 and 5,176,175. Typically, the primary shut off mechanism of such valves includes a metal valve needle tip making contact with a metal valve seat formed in the valve body. The needle is threadedly connected to the valve body, and turning the needle advances the needle tip into contact with the valve seat. The last part of the movement which makes positive contact of the needle with the valve seat includes rotation of the needle tip against the valve body. A special lubricant is used on the contact surfaces of the needle and valve seat. Without the lubricant, galling of the surfaces of the valve seat and needle tip could occur. In addition, to ensure that the needle and valve seat form a reliable seal, the machining tolerances of these parts must be tightly controlled, which adds manufacturing expense.

SUMMARY OF THE INVENTION

The present invention provides an improved valve that eliminates these problems. A valve according to the present invention includes a bonded elastomer seal ring disposed between the valve needle and valve seat to provide the seal, which eliminates the metal-to-metal contact of conventional valves and the need for expensive lubrication. The bonded elastomer seal is compressed between the valve needle and the valve seat and forms gas-tight seals on the surfaces of the valve needle and valve seat. The compressible bonded elastomer seal also reduces the tolerance requirements for the valve needle and valve seat.

The valve according to the invention can be used in place of expensive long needle valves for flow control. The valve of the invention is useful for gas torches and may be adapted for use controlling other fluid flows.

A valve according to the invention includes a valve body having an inlet connectable to a source of gas and having an internal bore to guide gas or fluid therethrough. An outlet passage connects to the bore and leads to an outlet orifice for the burner tube. A valve seat is formed in the internal bore adjacent the outlet passage. A valve needle is movably disposed in a portion of the internal bore, preferably with screw threads, and is thus rotatable in the threads to open or close the internal bore to the outlet passage, that is, to move from or advance toward the valve seat. Screw-threaded valve needles are convenient in torches; for other valving applications for the invention, other means for moving the valve needle are possible, including mechanical linkages or hydraulic fluid, for example.

According to the invention, the ring-shaped bonded elastomer seal is disposed between the valve needle and the valve seat. The valve needle has an end face that faces the valve seat. Closing the valve needle presses the end face against the bonded elastomer seal and valve seat, which compresses the bonded elastomer seal tightly against both the valve needle and valve seat to provide the seal. Opening the valve needle allows the bonded elastomer seal to be moved by gas pressure from the valve seat, which opens the bore for gas flow to the outlet passage.

According to another aspect of the invention, means for moderating the flow of gas through the valve is provided. The valve needle includes an axial recess that opens at the end face. A pin having a head and spring are disposed in the axial recess and extend partly out of the recess toward the valve seat. A counterbore is formed in the bore below the valve seat to serve as a seat for the pin head and a gasket carried by the head. The spring biases the pin toward the seat in the counterbore so that the pin head and gasket rest on the seat. The spring constant is selected so that a predetermined gas pressure will overcome the spring force, and allow gas to flow past the pin head.

BRIEF DESCRIPTION OF THE DRAWINGS

The invention may be better understood through the following description in conjunction with the appended drawings, in which.

DETAILED DESCRIPTION

The described embodiment of the invention relates to a gas torch. The invention, however, may be readily incorporated in valves for other fluid flow devices, as will be appreciated by those skilled in the art. The described embodiment is to be considered illustrative and not limiting.

Figure 1:
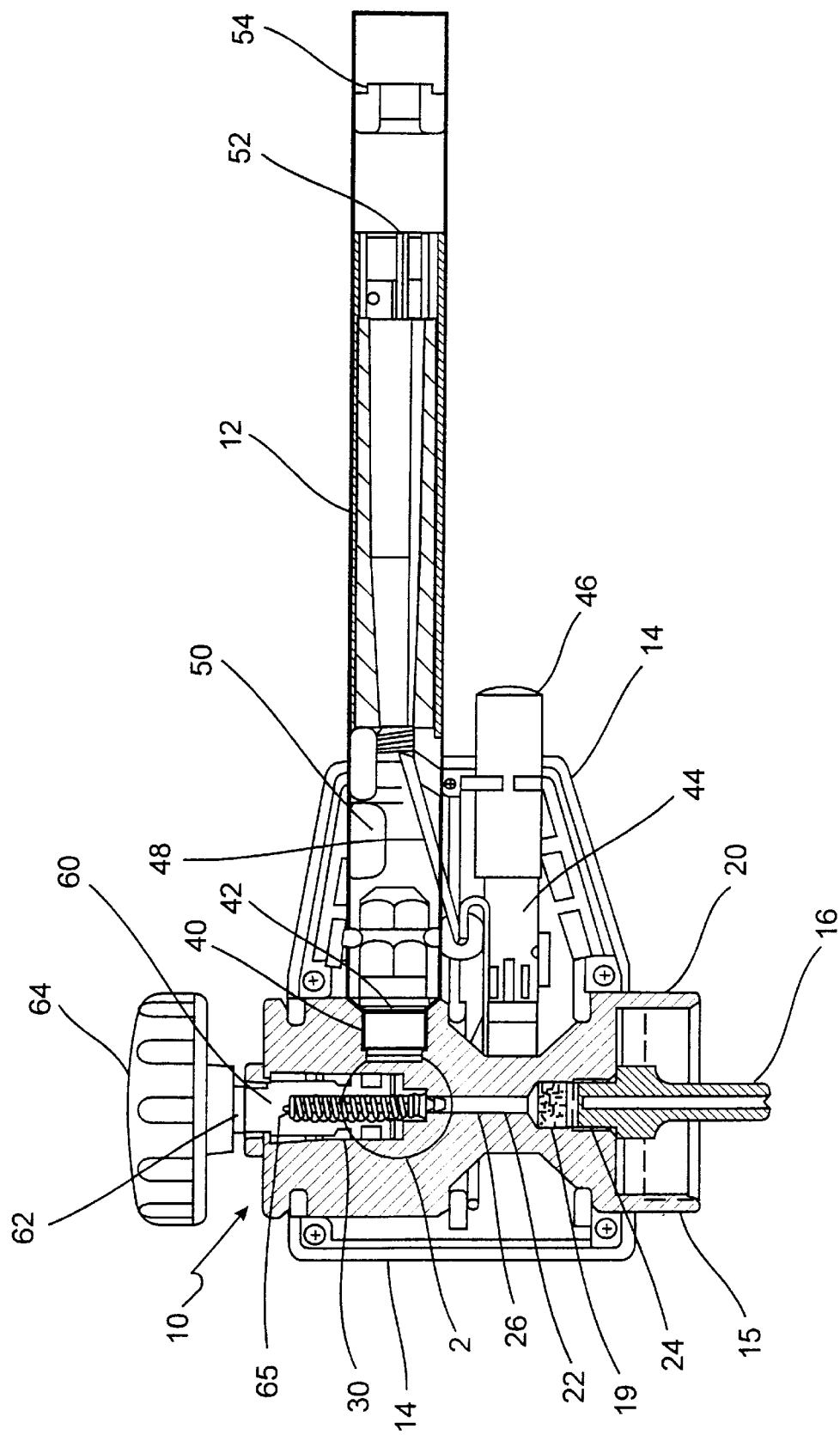
FIG. 1 is a sectional view of a torch assembly including a valve in accordance with the invention.

FIG. 1 shows an axial sectional view of a torch assembly in accordance with the invention. The torch assembly includes a valve assembly 10, a torch tube 12, and a housing 14. The housing 14 encloses portions of the valve assembly 10 and torch tube 12. The valve assembly 10 includes a valve body 20 having at an inlet end a threaded collar 15 and an attached pusher pin 16 for coupling the valve to a source of pressurized gas, for example, a gas bottle or canister (not illustrated). The coupling means illustrated is for propane gas cylinders; however, the type of fuel and the type of coupling for the valve are not part of the invention. Another gas coupling suited for another fuel source may, of course, be used with the valve assembly 10.

The valve body 20 has a bore extending therethrough, which in the illustrated embodiment is shown as axially oriented. Referring now to both FIG. 1 and FIG. 2, the bore 22 includes three sections of different size. An inlet section 24 of the bore is at the inlet end of the valve body 20 where pressurized gas enters the valve body. In the illustrated embodiment, the pusher pin 16 and a filter 18 are shown mounted in the inlet section 24. A central section 26 of the bore extends from the inlet section 24 axially to a counterbore 28. The counterbore 28 has a larger diameter than the central section 26 itself, which provides a seat 34 at the junction. The bore 22 also includes a valve needle section 30 extending from the counterbore 28 of the central section 26. The valve needle section 30 has a diameter greater than that of the counterbore 28, which provides a valve seat 32 at the junction between the valve needle section 30 and the part of the central section 26 including the counterbore 28. A valve needle 60 is disposed in the valve needle section 30 of the bore 22 for controlling the flow of gas through the valve body 20, as further described below.

An outlet passage 40 extends from the valve needle section 30 at a location adjacent to the valve seat 32 and opens on an outer surface of the valve body 20. An orifice block 42 is installed in the outlet passage. Pressurized gas entering the valve body 20 flows from the inlet section 24 through the bore 22 and the outlet passage 40 and out of the outlet orifice 42.

The torch tube 12 is mounted to the valve body 20 with the outlet orifice 42 extending therein to introduce gas into the tube. An igniter 44 and a push button 46 to activate the igniter are mounted in the housing. An electrode 48 extends from the igniter 44 into the tube 12 and from there extends to a spark gap at the electrode tip 52. Gas flowing from the orifice 42 draws air in through holes 50 into the tube and the air and gas mix as they flow through the tube. The mixture is ignited at the tip of the electrode 52, and a flame forms at the end of the tube. A similar igniter and electrode arrangement is described in U.S. Pat. No. 5,123,837. A flame holder 54 disposed at the end of the tube 12 helps to stabilize the flame.

Figure 2:
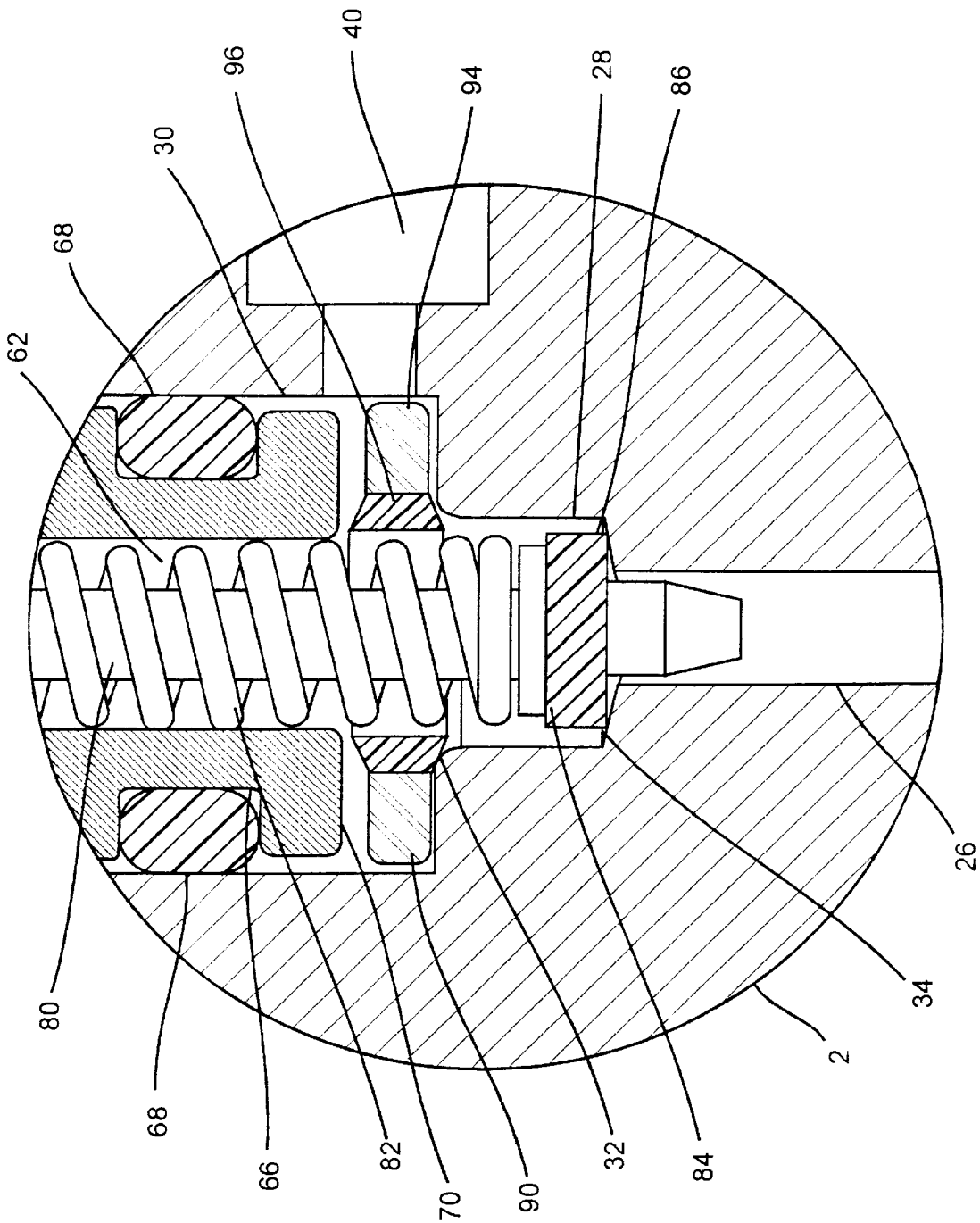
FIG. 2 is an enlarged section of the torch identified by the circle marked 2 in FIG. 1.

An enlarged section 2 of the valve body 20 is shown FIG. 2. The valve needle 60 disposed in the valve needle section 30 of the bore 22 forms a valve control means in cooperation with the valve seat 32. An end face 70 of the valve needle 60 is formed on an inlet-directed end of the needle and faces the valve seat 32.

The valve needle 60 includes a groove 66 formed circumferentially on an outer surface thereof. An o-ring 68 is disposed in the groove 66 to seal the outer surface of the valve needle 60 in the valve needle section 30 of the bore to prevent gas from escaping the valve body through the valve needle section.

A stem 62 of the valve needle 60 extends from the valve body 20 and a knob 64 is attached to the stem for manipulation of the valve needle. The valve needle 60 is threadedly attached in the valve needle section 30 of the bore for actuation of the valve needle by rotation. According to a preferred embodiment, the threads in the valve needle 60 and valve body 20 are set so that the valve needle executes one rotation between an open position and a closed position.

Other valve needle mountings are also possible, for example, a bayonet type fastening. In applications where manual manipulation of the valve needle is not desirable, a mechanical linkage or hydraulic system may, for example, be employed.

A bonded elastomer seal 90 is disposed in the valve needle section 30 between the valve needle 60 and the valve seat 32. A pin 80 and spring 82 disposed is a hole in the valve needle, described in detail below, extend through a hole 92 (shown in FIG. 3) in the bonded elastomer seal 90.

The flow connection between the valve needle section 30 and the outlet passage 40 is controlled by positioning the valve needle 60 relative to the valve seat 32. The valve needle 60 has a closed position in which the end face 70 compresses the bonded elastomer seal 90 against the valve seat 32 thereby preventing gas from flowing from the central section 26 of the bore to the outlet 40. In the open position, the end face is positioned away from the valve seat 32, freeing the bonded elastomer seal 90 to be moved from the valve seat 32 by gas pressure, which allows gas to flow from the central section 26 to the outlet passage 40. The bonded elastomer seal 90 is not fastened to the pin 80 and spring 82, and the hole is sufficiently large so that the bonded elastomer seal can move freely when pressurized gas flows from the central section 26. The bonded elastomer seal 90 is blown upward (in FIG. 2) on the gas flowing from the central section 26 of the bore 22, and the pin 80 and spring 82 maintain the seal on the axis of the bore.

Figure 3:
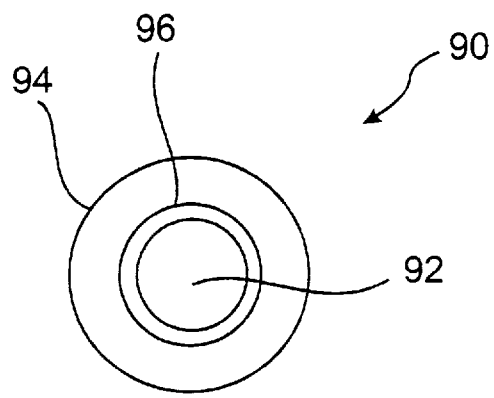
FIG. 3 is a top view of a bonded seal used in the torch assembly in accordance with the invention.
Figure 4:
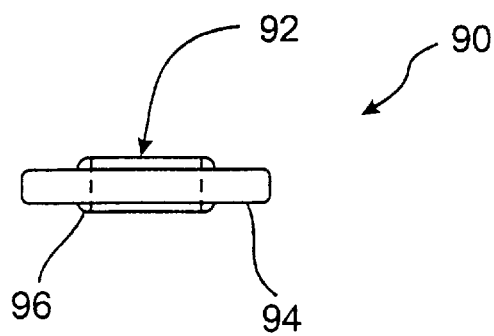
FIG. 4 is a side view of the bonded seal of FIG. 3.

FIGS. 3 and 4 illustrate a bonded elastomer seal that may be used in the valve according to the invention. Bonded elastomer seals are available commercially from different sources, and for example, from Wynn's-Precision, Inc. of Lebanon, Tenn. under the trademark "DYNA-SEAL". The bonded elastomer seal 90 is ring shaped with a central hole 92. A retaining ring 94 formed of metal or another suitable material forms the outer margin of the ring. A resilient, elastic flange 96 is molded in place to the inner margin of the metal ring 94. The flange material may be selected for the type of gas to provide the appropriate impermeability, resiliency and durability.

As may be understood from FIG. 2, as the end face 70 of the valve needle 60 is moved against the bonded elastomer seal 90, the seal flange 96 deforms against the valve seat 32 and end face 70 of the needle 60, which provides a gas-tight seal on these surfaces. Because of the support provided by the metal ring 94 radially outward of the flange 96, gas pressure acting on the inside of the flange actually forces the flange tighter against the valve seat 32 and end face 70, which improves the seal. The metal retainer 94 also provides a positive stop for the end face. The arrangement of a bonded elastomer seal 90 acting between the valve needle end face and the valve seat provides a reliable, durable and simple structure for sealing the valve.

The pin 80 and spring 82 arrangement is disposed in the recess 62 to moderate the gas flow pressure from the inlet side (the inlet and central sections) to the outlet passage 40 when the valve is in the open position. A similar arrangement is disclosed in greater detail in U.S. Pat. No. 5,176,175 and reference is made thereto. The pin 80 has an elongated body and includes a flange-like head 84. The spring 82 is constrained between an upper end 65 of the recess and the pin head 84 to bias the pin head out of the recess toward the counterbore 28 of central section 26. A gasket 86 is disposed on the face of the flange 84 facing the counterbore 28. The seat 34 of the counterbore 28 engages the flange 84 and gasket 86 to close the central portion 26 when the spring 82 biases the pin 80. The spring force is overcome by sufficiently high pressure of the gas from the gas source to allow the pin 80 to move to open the seat 34. The spring 82 may be selected to have a spring constant appropriate for the working gas pressure of the torch. The pin 80 and spring 82 arrangement provides automatic adjustment for pressure variations in the gas source to maintain a substantially constant gas pressure in the outlet passage 26.

The invention has been described in terms of preferred embodiments, principles and modes of operation. The invention should not be construed as limited to the particular embodiments described. Instead, the above-described embodiments should be regarded as illustrative and not restrictive, and variations, changes and equivalents may be made by others without departing from the scope of the invention as defined by the following claims.

I claim:

1. A valve for regulating a flow of pressurized fuel, comprising:
   a valve body having a bore extending therethrough and forming an inlet, the bore including at least a valve needle section, the valve needle section being shaped to define a valve seat, the valve body further having an outlet passage communicating with the valve needle section and extending from the valve needle section outward to an outlet on an outer surface of the valve body;

a valve needle movably disposed in the valve needle section, the valve needle having an end face facing the valve seat;

a bonded seal ring disposed between the end face of the valve needle and the valve seat; and, means for positioning the valve needle at a selectable position in the valve needle section of the bore, including a closed position with the end face of the valve needle compressing the bonded seal ring against the valve seat and an open position with the end face positioned away from the valve seat to allow gas passage from the bore to the outlet passage.

2. The valve as claimed in claim 1, further comprising means for sealing an outer surface of the valve needle in the valve needle section of the bore.

3. The valve as claimed in claim 2, wherein the outer surface of the valve needle has a circumferential groove formed therein, and said means for sealing the outer surface of the valve needle includes an o-ring disposed in the circumferential groove.

4. The valve as claimed in claim 1, wherein said means for selectably positioning the needle comprises a screw-thread portion formed on the valve needle and a mating screw-thread portion formed in the valve body, wherein, the screw-threaded portion of the valve needle is rotatably engaged in the screw-threaded portion of the valve body, the valve needle having a stem extending from the valve body and a knob attached to the stem for manipulation of the valve needle.

5. The valve as claimed in claim 4, wherein the screw-threaded portions of the valve needle and valve body are set so that approximately one revolution of the valve needle moves the valve needle between the closed position and the open position.

6. The valve as claimed in claim 1, further comprising means for retaining the bonded seal ring in alignment with a movement direction of the valve needle.

7. The valve as claimed in claim 1, further comprising means for moderating a flow of gas from the valve body bore to the outlet.

8. The valve as claimed in claim 7, wherein the means for moderating a flow of gas comprises:

the valve needle having an axial recess opening at the end face;

a pin disposed partly in the axial recess and having a portion including a head extending from the axial recess toward the valve seat, the pin carrying a gasket;

a spring disposed partly in the axial recess and acting on an inner surface of the axial recess and the pin head to bias the pin away from the recess; and the valve body bore including a counterbore adjacent the valve seat, wherein the counterbore defines a shoulder to engage the head of the pin and gasket.

9. The valve as claimed in claim 8, wherein the portions of the pin and spring extending from the valve needle extend through a hole in the bonded seal ring.

10. The valve as claimed in claim 1, further comprising means to connect the outlet to a torch tube.

11. The valve as claimed in claim 1, further comprising means to connect the inlet to a source of pressurized fuel.

12. A valve for regulating a flow of pressurized fuel, comprising:

a valve body having a bore extending axially therethrough, the bore including an inlet section, a central section with a counterbore, and a valve needle section, the valve needle section having a greater diameter than the counterbore of the central section, wherein at a juncture between the counterbore and the valve needle section a valve seat is defined, the valve body further having an outlet passage communicating with the valve needle section and extending from the valve needle section outward to form an outlet on an outer surface of the valve body;

a valve needle movably disposed in the valve needle section, the valve needle having an end face and having an axial recess opening on the end face;

a pin disposed in the axial recess and having a portion including a head extending from the valve needle;

a spring disposed in the axial recess and acting on an inner surface of the axial recess and the pin head to bias the pin away from the recess, the counterbore of the central section providing a seat for the pin head;

a bonded seal ring loosely disposed between the end face of the valve needle and the valve seat, the pin and spring extending through a hole in the ring; and, means for positioning the valve needle at a selectable axial position in the valve needle portion of the bore, including a closed position with the end face of the valve needle pressing the bonded seal ring to the valve seat and an open position permitting gas passage from the central gas bore to the outlet passage.

* * * * *